United States Patent

[11] 3,627,573

[72] Inventors John C. Schottmiller
38 Alberta Drive, Penfield, N.Y. 14526;
Francis W. Ryan, 77 Pembroke St.,
Rochester, N.Y. 14620; Charles Wood,
1034 DeKalb Ave., Sycamore, Ill. 60178

[21] Appl. No. 674,267
[22] Filed Oct. 10, 1967
[45] Patented Dec. 14, 1971
Continuation-in-part of application Ser. No. 550,215, May 16, 1966, now abandoned. This application Oct. 10, 1967, Ser. No. 674,267

[54] COMPOSITION AND METHOD
11 Claims, 1 Drawing Fig.

[52] U.S. Cl. .......... 117/201,
117/106, 106/47, 252/501, 252/512
[51] Int. Cl. .......... H01l 7/36
[50] Field of Search .......... 106/47;
252/501, 512; 117/201, 106 A

[56] References Cited
UNITED STATES PATENTS

| | | | |
|---|---|---|---|
| 2,759,861 | 8/1956 | Collins et al. .......... | 117/106 X |
| 2,938,816 | 5/1960 | Gunther .......... | 117/201 X |

OTHER REFERENCES

Pearson " The Glass Industry" Dec. 1964, 106– 147

*Primary Examiner*—William L. Jarvis
*Attorneys*—Frank A. Steinhilper, Ronald Zibelli and James J. Ralabate

ABSTRACT: This invention relates to a vitreous semiconductor comprising at least one metal and at least one nonmetal which is solid at room temperature, the semiconductor having at least 0.5 atomic percent metal and a greater than stoichiometric percentage of nonmetal. The invention also relates to a method for producing such semiconductors by coevaporating the metal and nonmetal and simultaneously quenching said metal and said nonmetal onto a substrate held at a temperature below the condensation point of either component.

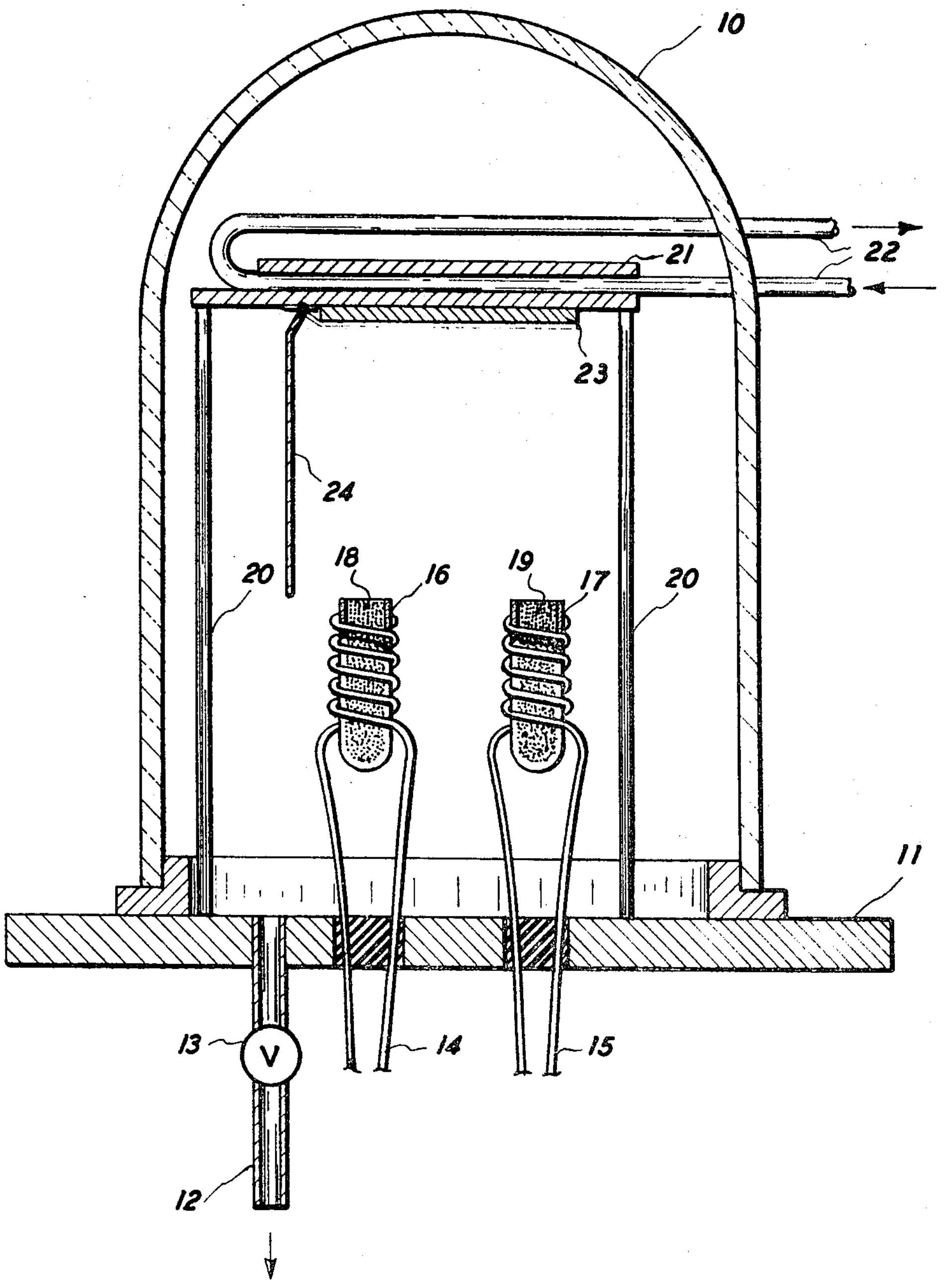
INVENTORS.
CHARLES WOOD
JOHN C. SCHOTTMILLER
BY FRANCIS W. RYAN
Ronald Zibelli
Joseph Hirsch
ATTORNEYS

COMPOSITION AND METHOD

This application is a continuation-in-part of copending application Ser. No. 550,215 filed May 16, 1966 in the names of Charles Wood, John Schottmiller and Francis Ryan and now abandoned.

BACKGROUND OF THE INVENTION

This invention relates to semiconductors or semi-insulators and in particular to a system utilizing new vitreous semiconductors.

Two common semiconductors are highly purified silicon and germanium with slight traces (parts per million or billion) of selected impurities and/or crystal imperfections being present to modify or change the semiconductor properties.

These impurities cause either loosely bound electrons that can move or carry some current or the impurities remove electrons from their normal place in the lattice and so form a "-hole" which can be filled by an adjacent electron whose movement creates a new hole which in turn is filled. The resulting movement of the hole is equivalent of electrical conduction in a direction opposite to that occurring when electrons move. Some of the more important semiconductor materials include silicon, germanium, selenium, cuprous oxide, ($Cu_2O$) lead sulfide, silicon carbide, lead telluride, and other compounds. Typical semiconductor applications are for use in rectifiers, modulators, detectors, thermistors, photocells, transistors, and electrical circuits.

As shown above, it can be seen that semiconductors may be made up of single elements or may consist of various compounds exhibiting semiconductive properties.

The preparation of known semiconductors involve of necessity, carefully controlled processing steps such as special melt techniques in crystal growth, epitaxial deposition, involved doping techniques, etc. Such highly controlled processes add to the cost of the final product. There is, therefore, an ever present need for new semiconductor materials which yield a wider range of desirable electrical properties and yet may be simply and economically manufactured.

OBJECTS OF THE INVENTION

It is, therefore, an object of this invention to provide a new class of semiconductors which overcome the above noted disadvantages.

It is another object of this invention to provide an improved process for producing thin layers of materials having desirable electrical properties.

It is a further object of this invention to provide an improved system for producing thin films of materials having improved electrical characteristics.

It is yet another object of this invention to provide a new class of vitreous semiconductors having desirable photoconductive properties.

It is another object of this invention to provide a new class of vitreous semiconductors having enhanced electrical characteristics.

SUMMARY OF THE INVENTION

The aforegoing objects and others are accomplished in accordance with the present invention by providing a method of forming new vitreous semiconductors having a wide range of compositions by coevaporating at least one metal and at least one nonmetal onto a substrate held at a temperature below the condensation point of either component. This substrate temperature will be substantially lower than either source temperature. By quenching the vapor of the components onto such a substrate, the different atoms are randomly mixed to form a continuous homogeneous noncrystalline film on said substrate, said film normally having greater than stoichiometric proportions of the nonmetal component. The present invention is in contrast to Cameron U.S. Pat. No. 2,932,599 who disclosed a vapor quenching process but holds his substrate at a temperature above the condensation point of the nonmetal. He, therefore, cannot produce semiconductive materials having a greater than stoichiometric amount of the nonmetal. Cameron characterizes his material as a reaction product and a compound thereby supporting the view that semiconductive materials having greater than stoichiometric proportions of nonmetal are not produced.

The materials of this invention can best be described as vitreous semiconductors or These materials possess electrical properties different from the components taken separately, or combined in stoichiometric amounts. X-ray diffraction patterns of these materials are of the so-called vitreous or noncrystalline type. These vitreous semiconductors may be described as thermodynamically metastable, although they possess a high degree of phenomenological stability and retain their structure at relatively high temperatures. In some instances, the crystallization temperature of these vitreous semiconductors is higher than either component alone.

This new class of semiconductors comprises elements selected from at least one solid or liquid metal and at least one solid nonmetal. Typical metals include cadmium, zinc, gallium, lead, thallium, neodymium, mercury, copper, silver, manganese, aluminum, bismuth, indium and antimony. Typical nonmetals include selenium, boron, arsenic, carbon, phosphorous, sulfur and tellurium.

These films may be formed in any convenient thickness. Although thicknesses of several hundred angstroms may be formed, films ranging from about 1000 A. up to 200 microns and higher, are most suitable for semiconductor applications.

BRIEF DESCRIPTION OF THE DRAWING

The advantages of this method will become apparent upon consideration of the following disclosure of the invention; especially when taken in conjunction with the accompanying drawing wherein:

The drawing illustrates one embodiment of an apparatus for preparing thin films of vitreous semiconductors in accordance with the herein disclosed method.

In the drawing, bell jar 10 rests on support plate 11 containing vacuum line 12 and control valve 13. Resistance heating circuits 14 and 15 are employed to heat evaporation crucibles 16 and 17 containing evaporation samples 18 and 19, respectively. A support 20, containing a water cooled base 21, is provided with water-cooling means 22. The substrate 23, which is to be coated, is supported on the water-cooled base 21. An aluminum mask 24, is hinged to base 21, and is adapted to overlay substrate 23 (as shown in dotted lines) to effectively mask the substrate until evaporation samples 18 and 19 are heated to a suitable temperature.

The metal and nonmetal are each placed in separate inert crucibles such as quartz or tantalum. In controlling the evaporation of the components, it is generally desirable to maintain the temperature of said components at between their melting point and boiling point. Thus, for example, in forming a cadmium-selenium amorphous film, containing about 20 percent cadmium and 80 percent selenium, a temperature of about 217°C. for selenium, and about 322°C. for the cadmium was found sufficient. To increase the amount of selenium in the film, the temperature of the selenium container would be increased and/or the temperature of the cadmium container lowered. To increase the amount of cadmium in the film, the above temperature changes would be reversed. Where a very slow rate of evaporation is desired, the evaporation temperature of one or both components may be maintained at a temperature below their melting point.

The vacuum chamber is maintained at a vacuum of about $2\times10^{-}$ to $2\times10^{-8}$ Torr, although vacua above and below this range can also be used satisfactorily. Under the above conditions, a film thickness of about 5 to 30 microns is obtained when evaporation is continued for a time ranging from about 1 to 3 hours at a vacuum of about $2\times10^{-5}$ Torr. It can be seen that the amount of a particular component in the vitreous film is primarily dependent upon the amount of metal or nonmetal evaporated which is source temperature dependent. It should be noted that the vitreous film may also be formed under nonvacuum conditions such as by vapor transport or sputtering.

The vitreous semiconductor films may be formed on any suitable substrate whether it be conductive or insulating. Typical conductive substrates are brass, aluminum, stainless steel, conductively coated glass or plastic, etc. Typical insulators are quartz, Pyrex, mica, polyethylene, etc.

Semiconducting compounds are generally composed of combinations of a metal with a nonmetal. In delineating the boundary between metals and nonmetals, the line drawn diagonally through the periodic table, known as the Zintl border, serves to differentiate the metals from the nonmetals. In this invention at least one element is taken from each side of this line, with the nonmetal being solid at room temperature and the deposited materials being characterized in that they are nonstoichiometric. Although crystalline compound semiconductors may be capable of small deviations from stoichiometry, the vitreous materials of the present invention can have wide deviations on the side of stoichiometry which has excess nonmetal. That is, by properly controlling the respective evaporation rates and by holding the substrate at a temperature below the condensation point of either component, and particularly below the condensation point of the nonmetal, excess nonmetal (i.e. more than a stoichiometric amount) is deposited in a thin semiconductive layer. Prior to this invention vitreous semiconductive materials of this type, especially those having a substantial but less than stoichiometric percentage of metal, could not be prepared.

The structure of the materials of this invention are in the glassy rather than the crystalline state. The structure is characterized by the absence of intermediate or long-range-order. X-ray diffraction patterns are of the so-called vitreous or noncrystalline type. These compounds cannot normally be prepared as glasses (cooled from the melt) and there is no report of vitreous materials or glasses ever having been prepared in these systems. There are, however, reports of unsuccessful attempts to prepare these materials. In particular, Kolomiets et al., "The Structure of Glass," Vol. 2, page 410, Consultant's Bureau, New York (1960), could not obtain glasses when either copper, silver, gold, zinc, cadmium, mercury, gallium, indium, thallium, germanium, tin or lead was heated together with selenium, sulfur, or arsenic at 900° C. followed by quenching.

With respect to the electrical properties, the vitreous materials of this invention can best be described as semiconductors or semi-insulators, that is, having a valence and conduction band separated by a forbidden energy gap. They possess electronic properties different from those of components taken either alone or combined in a stoichiometric crystalline condition. Although they may be properly described as thermodynamically metastable, they possess a high degree of phenomenological stability and retain their structure well above room temperature. Their crystallization temperature in some instances has been observed to be higher than either component alone.

These vitreous materials may be prepared only by quenching from the vapor phase and not by any of the melt techniques. In fact, many of the materials are immiscible in the liquid state to well above the boiling point of one of the components.

Vitreous semiconductive materials having up to the stoichiometric amount of metal can be produced in accordance with the herein disclosed method. The present invention and the products produced thereby should not be confused with doped vitreous layers, such as doped selenium. In doped layers, the dopants are normally present in extremely minute quantities, on the order of parts per million. Such products can be produced in accordance with well-known melt or diffusion techniques. It was not possible, until the present invention, to include substantial but less than stoichiometric amounts of the metal component without crystallizing the nonmetallic component. The present invention, however, achieves such incorporation without undesirable crystallization. As this incorporation forms an essential feature of the present invention, a preferred range of materials includes those semiconductive materials having substantial, but less than a stoichiometric amount, of the metal component. By substantial, it is meant more than doping quantities and at least 0.5 atomic percent metal. In general, such materials cannot be produced with prior art techniques because of phase immiscibility at higher concentrations of the metal component. In accordance with the herein disclosed method, such semiconductive materials can be produced in the amorphous state.

In a typical embodiment of this invention, the nonmetal selenium and a metal from the group consisting of cadmium, zinc, gallium, lead, thallium and bismuth form a family of vitreous semiconductors having particular application to the field of xerography. These compounds show photoconductive spectral response in wavelengths from the visible all the way to and including the infrared. The above metals in combination with selenium form vitreous semiconductors capable of receiving an electrostatic charge, and upon exposure to light, forming an electrostatic latent image, which is capable of being developed in the well-known xerographic mode such as that set forth in Carlson U.S. Pat. No. 2,297,691, and other related patents in the xerographic field.

The metal bismuth with selenium is sensitive to infrared radiation and may, therefore, be employed in a xerographic system receiving radiation which is out of the visual spectrum. Small amounts of bismuth, on the order of about 0.5–3 atomic percent (approximately 1.2–7.5 weight percent) have been shown to have a large effect in increasing the spectral sensitivity in the infrared region. Further amounts of bismuth increase the conductivity of the semiconductive material and make it unsuitable for xerographic purposes which require the retention of a latent electrostatic image on the material surface. However, the higher percentage bismuth-selenium semiconductor can be effectively utilized in systems other than xerographic which do not require retention of such a latent electrostatic image, such systems include infrared photodetection, vidicons, light amplifier panels, electroluminescent and other electro-optical devices. Bismuth-selenium alloys having about 11–16 atomic percent (approximately 24–34 weight percent) bismuth have been shown to have the best photodetection response in considering nonxerographic applications. Accordingly, the aforementioned percent ranges form preferred ranges for this particular semiconductor system at a substrate temperature of about 50°–55° C. when utilized as described above.

When used in a xerographic mode, the above materials are evaporated onto a suitable conductive substrate such as brass, aluminum, stainless steel, conductively coated glass or plastic, etc. The thus formed xerographic plate is then given a uniform electrostatic charge by a corona discharge device in order to sensitize its entire surface. The plate is then exposed to an image of activating electromagnetic radiation, such as light, which selectively dissipates the charge in the illuminated areas of the photoconductor while leaving behind a latent electrostatic image in the nonilluminated areas. This image may be developed and transferred to another material, with development being carried out by depositing finely divided, electroscopic marking particles on the surface of the photoconductive material to make said image visible. It should be pointed out that any suitable method may be used to attain an electrostatic image. Typical techniques are by use of a pin matrix as a print head, pin tubes, etc.

In another embodiment of this invention, it is possible to control the degree of order present. Under certain conditions a second phase of intermediate or long range order and crystalline in nature may be obtained dispersed throughout the vitreous noncrystalline matrix. Two critical parameters in achieving this result are (1) the system (i.e., the metal and nonmetal) utilized and (2) the substrate temperature. For a given system and a given substrate temperature, a particular concentration of metal in the vitreous matrix will be reached above which crystallinity will appear. To increase the concentration of the metal component in the vitreous matrix without achieving crystallinity, the substrate temperature, for example, can be lowered. On the other hand, to achieve greater crystallinity the substrate temperature can be increased.

As indicated above, for a given system and substrate temperature, a concentration of metal component will be reached above which crystallinity will appear. Accordingly, crystallinity can also be controlled by controlling the relative amounts of the two evaporating species. That is, by providing a percentage of metal greater than the particular value for crystallinity to appear, crystallinity will be achieved within the vitreous noncrystalline matrix. By providing a lower percentage of metal than the particular threshold value, no crystalline material is found dispersed throughout the vitreous matrix. The relative amounts of the two evaporating species can be controlled by varying their respective source temperatures. The second intermediate or long-range order phase may be obtained dispersed in the vitreous noncrystalline matrix by raising the temperature of one of the evaporating components to a relatively higher rate than the other component, the rate being such that it is above the particular threshold value at which crystallinity will begin to appear. For example, a cadmium-selenium film having approximately 30 percent of an intermediate or long-range order crystalline phase dispersed in a vitreous matrix of cadmium and selenium is obtained by maintaining the selenium at a evaporation temperature 217° C. and raising the evaporation temperature of the cadmium to about 375° C. (from the normal evaporation of about 322° C.).

Another technique for achieving the same result is by subsequently heat treating the deposited semiconductive layer.

The use to which such vitreous semiconductors may be employed is as varied as the uses to which semiconductors and semi-insulators have been used in the past. These uses include photoconductors; luminescent materials; electroluminescent materials; switching devices; superconductors; thermoelectric materials; ferroelectric materials; magnetic materials; electrophotographic receptors and many more.

DESCRIPTION OF SPECIFIC EMBODIMENTS

The following examples further specifically define the present invention with respect to the method of making and using vitreous semiconductors. The parts and percentages are by weight unless otherwise indicated. The examples below are intended to illustrate the various preferred embodiments of the invention.

EXAMPLE I

A 7 micron thick film containing about 20 percent cadmium (15 At percent) and 80 percent selenium (85 At percent) on a NESA plate is prepared by placing 10 gram samples each of cadmium and selenium pellets into separate quartz crucibles. The quarts crucibles are placed into a vacuum chamber which is evacuated to a vacuum of about $2\times10^{-5}$ Torr. A substrate of NESA glass is placed on a water cooled base located about 12 inches above the quartz crucibles and maintained at a temperature of about 54° C. The NESA glass is masked with a thin aluminum plate which is removed from the NESA surface as soon as the cadmium and selenium crucibles reach their evaporation temperature. The cadmium and selenium are then evaporated onto the NESA substrate by maintaining the temperature of the cadmium crucible at about 322° C. and the selenium crucible at about 217° C. by means of resistance heating elements. These conditions are maintained for about 2½ hours at which time the evaporation is terminated. The vacuum chamber is cooled to room temperature, the vacuum is then broken, and the film coated NESA plate removed from the chamber. No crystallinity is detected in the film when examined by X-ray diffraction. When tested for photoconductive spectral response, it is observed that the photoconductivity edge is extended about 900 angstroms toward longer wavelengths. Also of interest, is that the crystallization temperature as measured by differential thermal analysis is about 20° higher than pure selenium.

EXAMPLE II

The vitreous cadmium-selenium coated plate formed by the method of example I, is then used as follows in a xerographic mode: The plate is corona charged to a positive potential of about 300 volts, and then exposed to a 100 watt tungsten light source at a distance of about 16 inches for about 2 seconds to form a latent electrostatic image on the surface of said plate. The latent image is then developed by cascading an electroscopic marking material across the surface containing said image. The image is transferred to a sheet of paper and heat fused to make it permanent. Good quality copies of an original are obtained by this method.

EXAMPLE III

A film comprising a matrix of vitreous cadmium and selenium containing about 30 percent of an intermediate or long-range order crystalline phase dispersed throughout said matrix is prepared on a NESA substrate by the method set forth in example I by increasing the cadmium containing crucible to a temperature of about 375° C.

EXAMPLE IV

A film comprising a matrix of vitreous cadmium and selenium containing about 30 percent of an intermediate or long-range order crystalline phase dispersed throughout said matrix is prepared on the NESA substrate by the method of example I, by increasing the temperature of said substrate to about 140° C.

EXAMPLE V

A film comprising a matrix of vitreous cadmium and selenium containing about 30 percent of an intermediate or long-range order crystalline phase dispersed throughout said matrix is prepared on a NESA substrate by the method of example I, where subsequent to the treatment set forth in example I, the film and substrate are heated at a temperature of about 120° C. for about 5 minutes.

EXAMPLE VI

A 19 micron thick film containing about 5 percent lead (2 At percent) and 95 percent selenium (98 At percent) is prepared on a NESA substrate by the method of example I. During the evaporation, the lead containing crucible is held at a temperature of about 803° C. while the selenium containing crucible is maintained at about 217° C. Evaporation is complete in about 2 hours. X-ray diffraction reveals a vitreous structure with no evidence of crystallinity. The absorption edge of this material occurs at about 1.1 microns. A peak in photosensitivity is observed at 7,000 angstroms, although at 8,000 angstroms the photosensitivity is still about one-third the peak value. Steady state photoconductivity is observed out to the absorption edge (approximately 1.2 microns). The absorption edge and photoconductive edge are far from corresponding edges for either PbSe or selenium. Also, the vitreous lead-selenium material has a conductivity between that of selenium and PbSe. Thus, the electronic properties for the vitreous material are drastically different from the properties of any other components, or crystalline combination of the components.

EXAMPLE VII

The plate of example VI is then charged, exposed, and developed in the xerographic mode of example II to form a readable copy of an original image.

EXAMPLE VIII

A 24 micron film containing about 8 percent zinc (10 At percent) and 92 percent selenium (90 At percent) on an aluminum substrate is prepared by the method of example I. During evaporation of the components, the crucible containing the zinc is maintained at a temperature of about 411° C., while the selenium containing crucible is maintained at about 217° C. This film, when tested by X-ray diffraction, exhibits a noncrystalline structure and when tested for photoconductive spectral response, revealed a photoconductivity edge extending about 700 angstroms toward longer wavelengths as compared with vitreous selenium. The fundamental absorption edge of crystalline ZnSe occurs at 4,700 angstroms and thus crystalline ZnSe could not account for the extended spectral sensitivity.

EXAMPLE IX

The plate of example VIII is then charged, exposed, and developed in the xerographic mode of example II to form a readable copy of an original image.

EXAMPLE X

A film containing about 25 percent cadmium (19 At percent) and 75 percent selenium (81 At percent) is prepared by the method set forth in example I. During the evaporation step the cadmium containing crucible is maintained at a temperature of 356° C. and the selenium at 217° C. X-ray diffraction reveals a vitreous structure.

EXAMPLE XI

A film containing about 10 percent Zn (12 At percent) and 90 percent selenium (88 At percent) is prepared by the method set forth in example I. The zinc-containing crucible is maintained at a temperature of about 385° C. while the selenium is maintained about 217° C. No crystallinity is detected when this film is examined by X-ray diffraction.

EXAMPLE XII

A film containing about 1.5 percent bismuth and 98.5 percent selenium is prepared by the method set forth in example I. The crucible containing bismuth is maintained at a temperature of about 751° C. while the selenium is maintained at a temperature of about 217° C. The resulting vitreous film is then used as a xerographic infrared photoreceptor by subjecting the plate to the steps of charging, exposing and developing by the method of example II. Successful images are made using filters which cut out all visible light and transmit only radiation of wavelength greater than 8,200 angstroms.

EXAMPLE XIII

A film containing about 20 percent bismuth (4 At percent) and 80 percent phosphorous (96 At percent) is prepared by the method of example I. The crucible containing the bismuth is maintained at a temperature of about 751° C. while the crucible containing phosphorous is maintained at about 187° C. This film shows a vitreous structure when examined by X-ray diffraction.

EXAMPLE XIV

A film containing about 15 percent zinc (3 At percent) and 85 percent boron (97 At percent) is prepared by the method of example I. The crucible containing the zinc is maintained at a temperature of about 385° C. while the boron containing crucible is maintained at a temperature of about 2,100° C. by evaporating the boron with an electron gun. No evidence of crystallinity is detected when examined by X-ray diffraction.

EXAMPLE XV

A film containing about 25 percent cadmium (9 At percent) at 75 percent sulfur (91 At percent) is prepared by the method set forth in example I. The crucible containing the cadmium is maintained at a temperature of about 356° C. while the crucible containing sulfur is maintained at a temperature of about 100° C. When tested by X-ray diffraction the film reveals a vitreous structure.

EXAMPLE XVI

A film containing about 10 percent zinc (5 At percent) and 90 percent sulfur (95 At percent) is prepared by the method as set forth in example I. The crucible containing the zinc is maintained at a temperature of about 385° C. While the crucible containing the sulfur is maintained at a temperature of about 100° C. No evidence of crystallinity is detected when this film is examined by X-ray diffraction.

EXAMPLE XVII

A 17.1 micron amorphous film containing about 3 percent bismuth and 97 percent selenium is prepared by the method as set forth in example I. The crucible containing the bismuth is maintained at a temperature of about 665° C. while the crucible containing the selenium is maintained at a temperature of about 326° C. The substrate is maintained at about 52° C.

EXAMPLE XVIII

A 62 micron amorphous film containing about 4.5 percent bismuth and 95.5 percent selenium is prepared by a modified form of the method as set forth in example I. The bismuth is evaporated from a Knusden source held at a temperature of about 756° C. while the crucible containing the selenium is maintained at a temperature of about 239° C. The substrate is held at a temperature of about 52° C.

EXAMPLE XIX

A 25 micron amorphous film containing about 6.4 percent bismuth and 93.6 percent selenium is prepared by the method as set forth in example I. The bismuth source is held at about 680° C. while the selenium source is held at about 290° C.

Examples XVII–XIX have resistivities on the order of $10^{12}$–$10^{10}$ ohm-centimeter, the resistivities decreasing with increasing bismuth percentage. As these films are sensitive to near (on the order of about 1 micron) infrared radiation, this combination of properties makes the materials suitable for near infrared xerographic photoreceptors.

EXAMPLE XX

A 12 micron amorphous film containing about 25 percent bismuth and about 75 percent selenium is prepared by the method as set forth in example I. The bismuth source is held at about 744° C. while the selenium source is maintained at about 242° C.

EXAMPLE XXI

A 16 micron amorphous film containing about 30 percent bismuth and about 70 percent selenium is prepared by the method as set forth in example I. The bismuth source is held at about 719° C. while the selenium source is held at 250° C. This film is found to have a resistivity on the order of $10^8$ ohm-centimeters and represents the approximate maximum photosensitivity for the vitreous bismuth-selenium semiconductors deposited on substrates held at about 50°–55° C. While the resistivity of this material is on the low side for xerographic applications, the photosensitivity characteristics of this material make it exceptionally useful for near-infrared photodetection apparatus.

EXAMPLE XXII

A 13 micron amorphous film containing about 33 percent bismuth and about 67 percent selenium is prepared by the method as set forth in example I. The bismuth source is held at about 726° C. while the selenium source is held at a temperature of about 258° C. The substrate is held at about 55° C.

EXAMPLE XXIII

A 32 micron amorphous film containing about 36 percent bismuth and about 64 percent selenium is prepared by a method as set forth in example I. The bismuth source is held at about 790° C. while the selenium source is held at about 242° C. The substrate is held at about 53° C.

EXAMPLE XXIV

A 29.2 micron amorphous film containing about 15.6 percent gallium (17 At percent) and about 84.4 percent selenium (83 At percent) is prepared by the method as set forth in example I. The gallium source is maintained at about 1,087° C. while the selenium source is maintained at about 217° C. The substrate temperature is maintained at about 53° C.

EXAMPLE XXV

A 20 micron thick film containing about 7.8 percent thallium and about 92.2 percent selenium is prepared by the method as set forth in example I. The thallium source is maintained at about 780° C. while the selenium source is maintained at about 217° C. X-ray examination indicates some crystallization of the selenium.

EXAMPLE XXVI

An 8.9 micron amorphous film containing greater than 10 percent but less than 50 percent indium, the balance being arsenic is prepared by the method as set forth in example I. The indium source is held at a temperature of about 990° C. while the arsenic source is maintained at about 390° C. The substrate is held at a temperature of about 25° C.

EXAMPLE XXVII

A thin film containing about 10 percent antimony and about 90 percent arsenic is prepared by the method as set forth in example I. The antimony source is maintained at about 518° C. while the arsenic source is maintained at about 290° C. The substrate is held at a temperature of −196° C.

Although specific components and proportions have been stated in the above description of the specific embodiments of this invention, other suitable materials and procedures, such as those listed above, may be used with similar results. In addition, other materials may be added which synergize, enhance or otherwise modify the properties of the plates.

Other modifications and ramifications of the present invention would appear to those skilled in the art upon reading the disclosure. These are intended to be included within the scope of this invention.

We claim:

1. A semiconductive element including:

a thin layer consisting essentially of a vitreous semiconductor material made up of a metal, and a nonmetal which is a solid at room temperature, said metal being present in a concentration of at least about 0.5 atomic percent and the balance consisting essentially of a nonmetal in a concentration greater than a stoichiometric amount, wherein said metal is selected from the group consisting of cadmium, zinc, gallium, lead, and bismuth, and the nonmetal is selenium.

2. The element of claim 1 in which the vitreous semiconductor layer consisting essentially of 15 atomic percent cadmium and 85 atomic percent selenium.

3. The element of claim 1 in which the vitreous semiconductor layer consisting essentially of 2 atomic percent lead and 98 atomic percent selenium.

4. The element of claim 1 in which the vitreous semiconductor layer consisting essentially of 10 atomic percent zinc and 90 atomic percent selenium.

5. The element of claim 1 in which the vitreous semiconductor layer consisting essentially of 19 atomic percent cadmium and 81 atomic percent selenium.

6. The element of claim 1 in which the vitreous semiconductor layer consisting essentially of 12 atomic percent zinc and 88 atomic percent selenium.

7. The element of claim 1 in which the vitreous semiconductor layer consisting essentially of 4 atomic percent bismuth and 96 atomic percent phosphorus.

8. The element of claim 1 in which the vitreous semiconductor layer consisting essentially of 3 atomic percent zinc and 97 atomic percent boron.

9. The element of claim 1 in which the vitreous semiconductor layer consisting essentially of 9 atomic percent cadmium and 91 atomic percent sulfur.

10. The element of claim 1 in which the vitreous semiconductor layer consisting essentially of 5 atomic percent zinc and 95 atomic percent sulfur.

11. The element of claim 1 in which the vitreous semiconductor layer consisting essentially of 17 atomic percent gallium and 83 atomic percent selenium.

* * * * *

PO-1050
(5/69)

UNITED STATES PATENT OFFICE
CERTIFICATE OF CORRECTION

Patent No. 3,627,573 Dated December 14, 1971

Inventor(s) John C. Schottmiller et al

It is certified that error appears in the above-identified patent and that said Letters Patent are hereby corrected as shown below:

In Claims 2-11, "consisting" should read --consists--.

Signed and sealed this 30th day of May 1972.

(SEAL)
Attest:

EDWARD M.FLETCHER,JR.
Attesting Officer

ROBERT GOTTSCHALK
Commissioner of Patents